Feb. 23, 1971     I. C. POGONOWSKI     3,564,858
BOAT LANDING FOR OFFSHORE STRUCTURE
Filed April 1, 1969     2 Sheets-Sheet 1
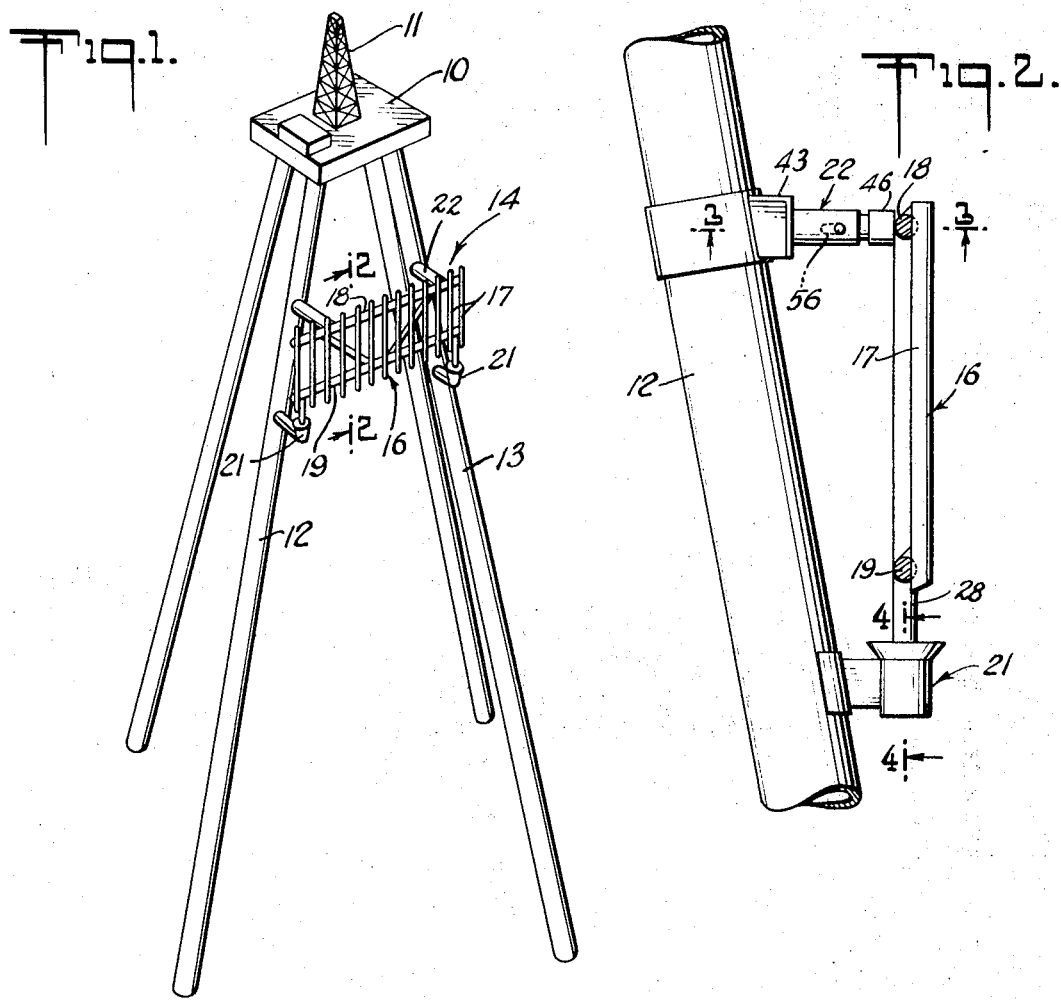
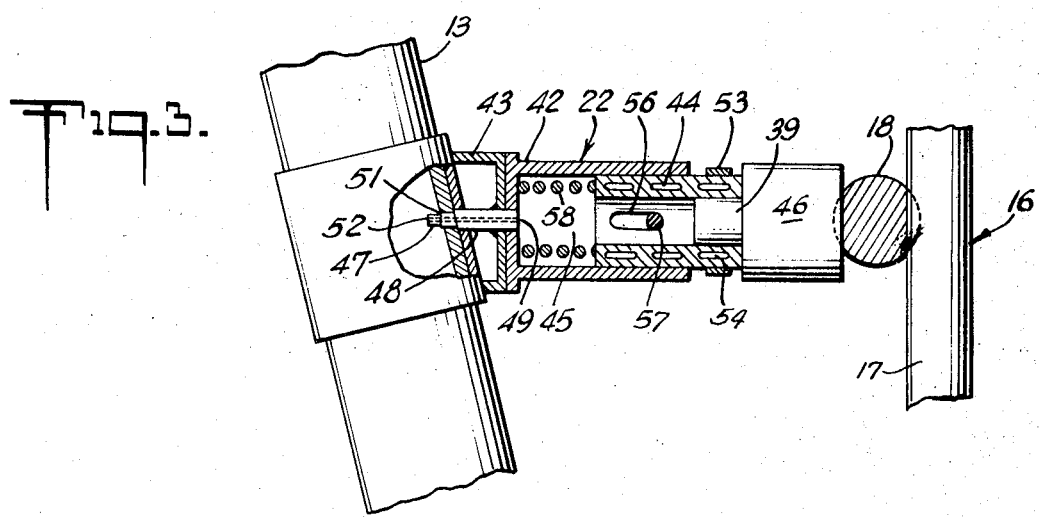

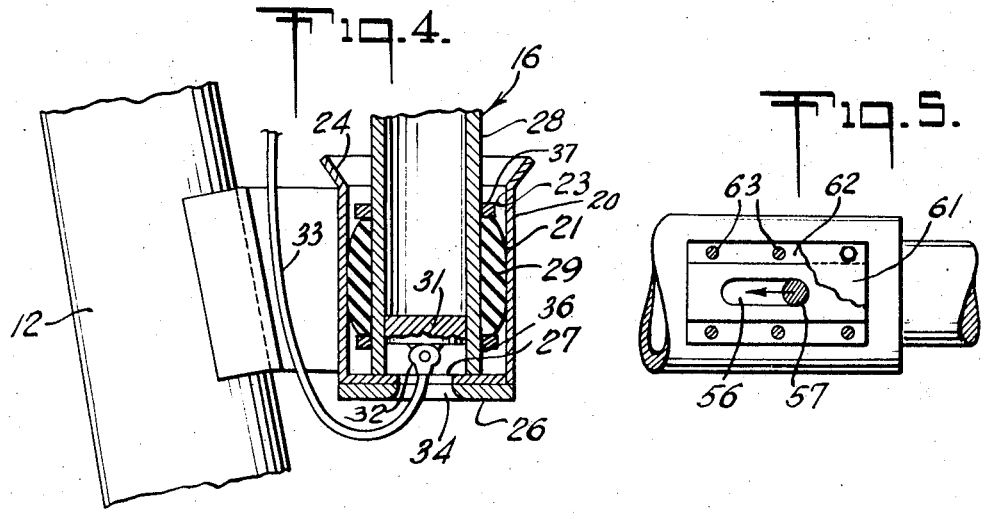

United States Patent Office 3,564,858
Patented Feb. 23, 1971

3,564,858
BOAT LANDING FOR OFFSHORE STRUCTURE
Ivo C. Pogonowski, Houston, Tex., assignor to Texaco Inc., New York, N.Y., a corporation of Delaware
Filed Apr. 1, 1969, Ser. No. 812,123
Int. Cl. E02b 3/22
U.S. Cl. 61—48  5 Claims

ABSTRACT OF THE DISCLOSURE

The invention relates to a landing platform for a pier or offshore structure which is ordinarily subject to high waves, turbulent water and/or a generally corrosive atmosphere. The replaceable landing platform is operably carried on the offshore structure and so mounted to absorb the shock of a floating vessel when the latter comes in severe contact with the platform during a docking, loading or unloading operation. The platform includes a resilient, pivotal connection as well as one or more shock-absorbing elements which permit restrained horizontal movement when the platform is subjected to a displacing force.

BACKGROUND OF THE INVENTION

Offshore structures of the type contemplated, normally employed in the drilling of oil and gas wells, are found in the Gulf of Mexico, California, Alaska, and in numerous other offshore waters bordering the United States as well as foreign countries. The structures may be located immediately offshore in relatively shallow water, or even several miles out. In any event they are continuously subjected to the environment of the area which may include extreme tidal changes, violent wave actions, or frequent storm conditions which induce turbulent water.

An operating necessity with such offshore structures is that they be serviced on a frequent basis by a variety of vessels ranging between the extremes of small power boats to large oil-carrying tankers. The boats are utilized for delivering personnel and supplies, as well as for carrying personnel and oil cargo from the offshore location to a shore-based refinery or the like.

One of the problems characteristic of offshore operation is the inherent danger during any transfer operation during inclement weather, to which personnel and equipment are exposed. It is appreciated for example that in relatively high seas, smaller vessels are difficult to control and are often thrown forcefully against the platform when attempting a docking operation. Such action results not only in damage to the vessel but frequently causes damage to the docking platform itself. It has also been determined through long experience, that during such transfer operations the incidence of personal injury is found to be quite high.

Landing platforms of various types have been utilized on offshore structures with varying degrees of success. However, since the structures are usually unprotected from natural elements, such landing platforms are frequently damaged to the extent of requiring replacement in whole or in part. As a matter of practicality, virtually the only shock-absorbing feature found to be applicable to known landing platforms is in the form of resilient bumpers or the like, positioned to meet the displacing force imparted by a docking vessel while subject to high seas or waves.

Replacement of damaged platform parts and components tends to be time consuming and expensive since the operation usually necessitates either removing the entire fender section, or utilizing divers to release underwater connections. In the instance of shock-absorbing means associated with the platform, such members are usually basic in construction to avoid damage or an accelerated wear rate resulting from exposure to salt water and other corrosive elements.

OBJECTS OF THE INVENTION

In overcoming the foregoing problems associated with offshore platforms, it is one of the objects of the invention to provide a novel docking system for boats and other floating vessels, including a shock-absorbing boat landing operably associated with an offshore platform. A further object is to provide a novel boat landing carried on an offshort structure and being adapted for quick and efficient removal for the purpose of facilitating repairs to the platform or to the structure. Still another object of the invention is to provide a shock-absorbing fender assembly of the type contemplated wherein the platform mounting means are simple in structure, and so constructed to resist the corrosive effects of an offshore atmosphere.

In achieving these objectives, and in overcoming the herein stated problems, there is presently provided a landing platform including an impact-resisting fender for an offshore structure, adapted to permit relatively safe contact between a floating vessel and the structure as the vessel is being docked. The landing platform is operably carried on the support structure at water level by at least one shock-absorbing element, together with at least one pivotally movable connection. The pivotal connection is such as to permit the fender to yield horizontally under the force of a floating vessel, while simultaneously absorbing the impact force to avoid or minimize damage to the platform and/or the boat.

DESCRIPTION OF THE DRAWINGS

In the drawings FIG. 1 illustrates a boat landing platform of the type contemplated operably supported on an offshore structure having legs extending to the floor of a body of water. FIG. 2 is a cross section taken along line 2—2 in FIG. 1. FIG. 3 is a segmentary view on an enlarged scale and in cross section, taken along line 3—3 in FIG. 2. FIG. 4 is a segmentary view on an enlarged scale and in cross section taken along line 4—4 of FIG. 2, and FIG. 5 is a segmentary view on an enlarged scale of the shock absorber shown in FIG. 3.

Referring to the drawings, FIG. 1 illustrates an offshore structure of the type contemplated which is positioned at the ocean floor in water depths up to several hundred feet. The structure consists of a deck 10 carrying a derrick 11, drawworks, and other equipment normally found on an offshore drilling or oil producing unit. The deck section is generally supported fifty or sixty feet above the water's surface primarily to maintain equipment out of direct contact or access to sea water.

In the presently shown structure, illustrating use of the landing platform, deck 10 is supported by a plurality of elongated legs 12 and 13 which extend downwardly from deck 10 to the ocean floor. The respective legs are substantially upright, and fixedly positioned at their lower end to the floor by piling or other suitable means whereby the entire unit when imbedded, becomes immobile at a particular drilling location. To facilitate the landing or docking of boats, barges, tankers and other floating vessels, landing platform 14 is operably retained on at least two of the legs in such a manner as to be at least partially submerged at all times in spite of water level changes due to tide and wave variations.

Referring to FIGS. 1 and 2, landing platform 14 comprises essentially a fender or rubbing element 16 formed of a plurality of vertical members 17, spaced apart and rigidized by upper and lower cross braces 18 and 19. The lower end of upright fender 16 is supported below the minimum water level by one or more, and preferably by two socket connections 21. The latter are arranged to permit the entire landing platform to be pivotally moved in a generally horizontal direction, around the lower connection or connections 21. As shown, in the present arrangement, at least two lower pivotal support points are provided, being spaced apart at the lateral extremities of fender element 16.

The upper end of fender 16 is movably supported by one or more, and preferably by at least two shock absorber assemblies 22 which extend from the upper crossed brace 18 to the stable structure leg 12. The number and disposition of shock absorbing elements 22 may of course vary with the size of a landing platform and the predetermined intensity of force to be exerted by a landing vessel. For the purpose of illustrating the present invention, two horizontally spaced shock absorbing units 22 are shown, which members act substantially independently as the bumper is displaced.

Upstanding vertical elements 17 are spaced apart approximately one to two feet on centers and may be formed of a variety of smooth faced, yet durable materials. For example, said elements may comprise wooden beams, or metallic tubular members, any of which might be readily replaced when worn or damaged. The vertical members 17 forming the fender 16 exposed surface, extend for a longitudinal distance sufficient to present an adequate landing surface to approaching vessels. In the instance of a wooden fender structure 16, vertical elements 17 may be bolted or otherwise removably fixed to cross braces 18 and 19. In the instance of the tubular metallic elements, the latter might be welded to the cross braces whereby to form the entire assembly into a relatively strong and yet flexible fender unit. It is understood, although not presently shown, that other supplementary bracing members might be further utilized to afford the necessary strength and yielding resistance.

Referring to FIG. 4, the lower pivotal connection between fender assembly 16 and leg 12, comprises the socket type joint 21 which permits a limited arcuate displacement of the fender assembly, when subjected to a horizontal displacing force. Each pivotal connection 21 includes a cuplike tubular member 20 formed by a base 26 peripherally connected to upstanding walls which define a vertical internal cavity 23 having a guide lip 24 at the upper end. Base 26 includes a wear pad 27 forming a partial closure to the lower end, which pad is adapted to receive the foot end of support post 28 depending from the vertical element 17.

Wear pad 27 may comprise a replaceable cushioning member, fastened to the upper face of base 26, or as presently shown, a relatively thick metallic member which abuttingly receives the lower end of support post 28. Wear pad 27 is further provided with a central opening 34 defined by a curved perimeter which affords access to a cable 33 passing through the opening for connection to support post 28. The cylindrical support post outer diameter as shown, is of a size less than the internal diameter of cavity 23. The outer periphery of post 28 is provided with a circular snubber or cuff 29 formed of a ringlike member of resilient, corrosion resistant material such as rubber or the like. Cuff 29 is longitudinally positioned at the post 28 lower end by spaced rings 36 and 37 which form an annular ring retaining groove therebetween. With cuff 29 disposed in the annulus formed between the adjacent walls of post 28 and cavity 23, the arcuate contour of the cuff's outer surface permits limited movement between said members both horizontally and arcuately.

The lower end of post 28 is further provided with a plug 31 set back from the post lower contact edge. A hook eye or similar bracket 32 carried in the plug 31 is adapted to receive, and fasten to one end of elongated cable 33 which passes through the wear pad opening 34 for connection at the other end to deck 10. The normal function achieved by cable 33 is to flexibly anchor the upright element 17 in socket 23, and to guide said element into place after it has been withdrawn from the socket for replacing damaged members.

Referring to FIG. 3, the upper end of fender assembly 16 is provided with one or more, and preferably at least two adjustable length shock absorbers 22 which extend from the fender upper end, and are fixed to the offshore structure. As shown in FIG. 3, each shock absorber assembly 22 comprises a cylindrical casing 42 having one end connected to a bracket 43, which depends from leg 13 of the structure. The forward open end of casing 42 slidably receives an elongated cylindrical resilient sleeve 44. The latter is received on and firmly engages a protruding hub 39 at the end of a plunger 46, the other end of said plunger being fastened to cross brace 18 of fender assembly 16.

Shock absorber casing 42 includes a base plate 49 forming a closure at the casing end, which in effect defines an internal chamber 45 within the casing. In one casing embodiment, a valve means 47 is communicated with the chamber 45. Said valve means 47 includes a fluid conduit 48 engaged to and extending through the base plate 49, and sealably connected to the wall of leg 13 whereby the valve opening is connected with the leg interior and protected from the elements.

The inner end of conduit 48 is provided with a check valve 51 having a restricted orifice 52 forming a transverse passage therethrough. When normally functioning, valve 51 permits the rapid passage of air into the leg 12 from chamber 45 as shock absorber 22 contracts under inward movement of fender assembly 16. Thereafter, orifice 52 restricts the flow of return air into chamber 45 as the shock absorber slowly returns to its normally expanded position. Such controlled movement will permit a floating vessel to forcefully engage the fender with a cushioned impact.

Resilient sleeve 44 is formed with a cylindrical compressible wall and is slidably received within the outer portion of the casing 42 to form a fluidtight annular seal with contiguous walls of the latter, thereby to maintain chamber 45 in a substantially liquid tight atmosphere. Sleeve 44 opposite end as mentioned is, sealably carried on the circular projection 39 extending axially from plunger 46, and fixed thereto by a clamping ring 53.

Sleeve 44 may be formed of a unitary cylindrical member fabricated of a rubber composition or other compressible material. For rigidity, a reinforcing component such as a spring 54 or similar element may be formed within the sleeve wall.

Plunger 46 functions to pivotally connect sleeve 44 with fender assembly 16 at a pin joint or, as shown, a solid though operable connection. Thus, the remote end of plunger 46 is operably connected to the cross brace 18 such that as the latter moves horizontally, relative movement between the respective elements of the shock absorber 22 will be substantially horizontal although in actuality an arcuate movement.

Sleeve 44 is operably retained within chamber 45 of casing 42 along a relatively long peripheral bearing area which forms an annular seal with the casing wall. A longitudinally extending slot 56 in the wall of sleeve 44 is formed to receive one or more locking pins 57. The latter extends transversely of casing 42 and is registered in the correspondingly positioned slots 56, whereby the sleeve 44 is axially slidable within the casing 42 to an extent as defined by the limitations of the slot's length.

A compression spring 58 or similar cushioning member is retained within chamber 45 at base plate 49 to engage the end face of the sleeve 44 as the latter is compressed into the chamber 45 in response to inward movement of fender 16. Spring 58 may be disposed in engagement with the end face of sleeve 44, or sufficiently shortened to function as a reserve bracing member when sleeve 44 is depressed beyond a predetermined length.

Referring to FIG. 5, a removable cover plate 61 carried on the exterior wall of casing 42 compresses a resilient gasket 62. Said plate 61 provides access to pin 57, and defines a water tight closure across slot 56 held in place by bolts 63.

Other modifications and variations of the invention as hereinbefore set forth may be made without departing from the spirit and scope thereof, and only such limitations should be imposed as are indicated in the appended claims.

What is claimed is:

1. In a docking facility for an offshore structure adapted to safely accommodate a floating vessel in turbulent waters during a docking operation in which the vessel is wharfed to said docking facility;
  (a) an elongated fender means operably carried on said structure, and having a lower portion thereof submerged beneath the water's surface,
  (b) at least one pivotally actuatable connection means engaging and maintaining said fender means lower end a fixed distance from said structure, and
  (c) at least one adjustable length shock absorbing member operably engaging said fender means to said structure, said shock absorbing member being collapsible in a direction toward said structure, whereby said shock absorbing member will yield in response to movement of said fender means about said pivotally actuatable connection when said fender means is forcefully contacted by said floating vessel,
  (d) said at least one pivotally actuatable connection means being disposed at the lower end of said fender means, and submerged beneath the surface of said body of water, and said at least one shock absorbing member being engaged with the fender upper end.

2. In a docking facility as defined in claim 1 wherein, said at least one pivotally actuatable connection includes, an upstanding socket member connected to said structure and having an open upper end diametrically opposed from a lower seat, a bearing head depending downwardly from said fender means and received on said lower seat, whereby to define an annulus between said socket member and said bearing head to permit a limited displacement of said fender means about said at least one pivotal connection.

3. In a docking facility as defined in claim 2 including, a resiliently yieldable cuff disposed in said annulus in rubbing engagement with said socket wall and said bearing head.

4. In a docking element as defined in claim 3 wherein, said resiliently yieldable cuff is formed of a ring member carried on said bearing head and in engagement with said socket member inner wall.

5. In a docking element as defined in claim 3 wherein, said resiliently yieldable cuff is formed in a ring-like configuration carried on said bearing head and having an arcuate peripheral surface slidably engaging said socket member inner wall.

References Cited
UNITED STATES PATENTS

| | | | |
|---|---|---|---|
| 3,146,013 | 8/1964 | Kappen | 293—85X |
| 3,459,004 | 8/1969 | Morini | 61—48 |

J. KARL BELL, Primary Examiner

U.S. Cl. X.R.

114—219